(12) United States Patent
Toda

(10) Patent No.: US 7,421,518 B2
(45) Date of Patent: Sep. 2, 2008

(54) COMMUNICATION METHOD AND PROCESSOR

(75) Inventor: Kentaro Toda, Minato-ku (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 540 days.

(21) Appl. No.: 10/972,532

(22) Filed: Oct. 26, 2004

(65) Prior Publication Data
US 2005/0223132 A1 Oct. 6, 2005

(30) Foreign Application Priority Data
Apr. 2, 2004 (JP) ............. 2004-109757

(51) Int. Cl.
G06F 13/28 (2006.01)
(52) U.S. Cl. ................. 710/22; 710/10; 710/20; 710/36; 710/100
(58) Field of Classification Search ............ 710/22, 710/10, 20, 36, 100
See application file for complete search history.

(56) References Cited

U.S. PATENT DOCUMENTS

| 4,503,513 A | * | 3/1985 | Pogue, Jr. ............... 710/110 |
| 5,682,551 A | * | 10/1997 | Pawlowski et al. ........... 710/36 |
| 5,771,396 A | * | 6/1998 | Arnold .................... 710/20 |
| 7,107,362 B2 | * | 9/2006 | Wheless et al. ............. 710/10 |
| 2004/0177183 A1 | * | 9/2004 | Takahashi et al. .......... 710/100 |

FOREIGN PATENT DOCUMENTS

| JP | 5-336296 | 12/1993 |
| JP | 6-046103 | 2/1994 |

* cited by examiner

Primary Examiner—Tonia L. M. Dollinger
Assistant Examiner—Brooke J Dews
(74) Attorney, Agent, or Firm—Studebaker & Brackett PC; Donald R. Studebaker (57) ABSTRACT

A processor has a central processing unit and a first interface. The central processing unit sets a communication parameter in a configuration register in the communication interface. A direct memory access controller or a data transfer controller then sets the same parameter in a register in a communication setup interface or an output port controller, which transmits the parameter to an external device with which the processor communicates through the communication interface. Alternately, the central processing unit sets the communication parameter in the communication setup interface or output port controller, and the direct memory access controller or data transfer controller sets the same parameters in the configuration register in the communication interface. Either scheme reduces the load on the central processing unit.

18 Claims, 7 Drawing Sheets

COMMUNICATION METHOD AND PROCESSOR

BACKGROUND OF THE INVENTION

1. Field of the Invention

The present invention relates to a method of communication between a processor and an external device, and to a processor employing this method of communication.

2. Description of the Related Art

Japanese Unexamined Patent Application Publication No. 5-336296 discloses a communication method in which the functions of a communication terminal such as a facsimile machine are set up according to values sent through an interface that connects the terminal to a host computer.

Japanese Unexamined Patent Application Publication No. 6-46103 discloses a communication method in which, upon reception of data according to a predetermined protocol, a central processing unit (CPU) sends a direct memory access (DMA) request signal to a DMA controller, which then transfers data between a memory device and a communication device without CPU intervention.

In conventional communication methods such as these, when a processor transmits internal data to an external device, or receives data from an external device, it is first necessary to set configuration data, such as data specifying the data communication speed or bit rate, in both the external device and the processor's data communication interface. Both settings are conventionally carried out by the processor's CPU, but this places an undesirable burden on the CPU, particularly when the configuration data have to be set frequently.

SUMMARY OF THE INVENTION

An object of the present invention is to provide a method of communication between a processor and an external device in which the processor's CPU does not have to set configuration data such as data specifying the communication speed both in the processor's data communication interface and in the external device.

The invention pertains to a processor having a CPU, a first interface for transferring data between the processor and an external device, and a second interface for controlling the external device. In the invented communication method, the CPU sets a communication parameter in either the first interface or the second interface. The communication parameter is then transferred to either the second interface or the first interface without CPU intervention. The communication parameter is also transferred from the second interface to the external device, after which data are transferred between the processor and the external device through the first interface according to the communication parameter.

The first interface is thus a data communication interface. The second interface may be a communication setup interface, for example, or an output port and its controller. The communication parameter may be specified by configuration data.

As means of transferring the communication parameter without CPU intervention, the processor may have a DMA controller. The communication parameter may be stored in a memory and read from the memory by both the CPU and the DMA controller. A plurality of communication parameters, stored at different addresses in the memory, may be transferred in this way.

Alternatively, as means of transferring the communication parameter without CPU intervention, the processor may have a data transfer controller that transfers the communication parameter from the first interface to the second interface, or from the second interface to the first interface, preferably over a dedicated bus. If the first or second interface is capable of transferring data on the dedicated bus, the means of transferring the communication parameter without CPU intervention may simply comprise the dedicated bus.

According to the invention, the CPU processing load occasioned by communication with the external device is reduced because the CPU has to set the communication parameter in only one place.

DETAILED DESCRIPTION OF THE INVENTION

Embodiments of the invention will now be described with reference to the attached drawings, in which like elements are indicated by like reference characters.

Figure 1:
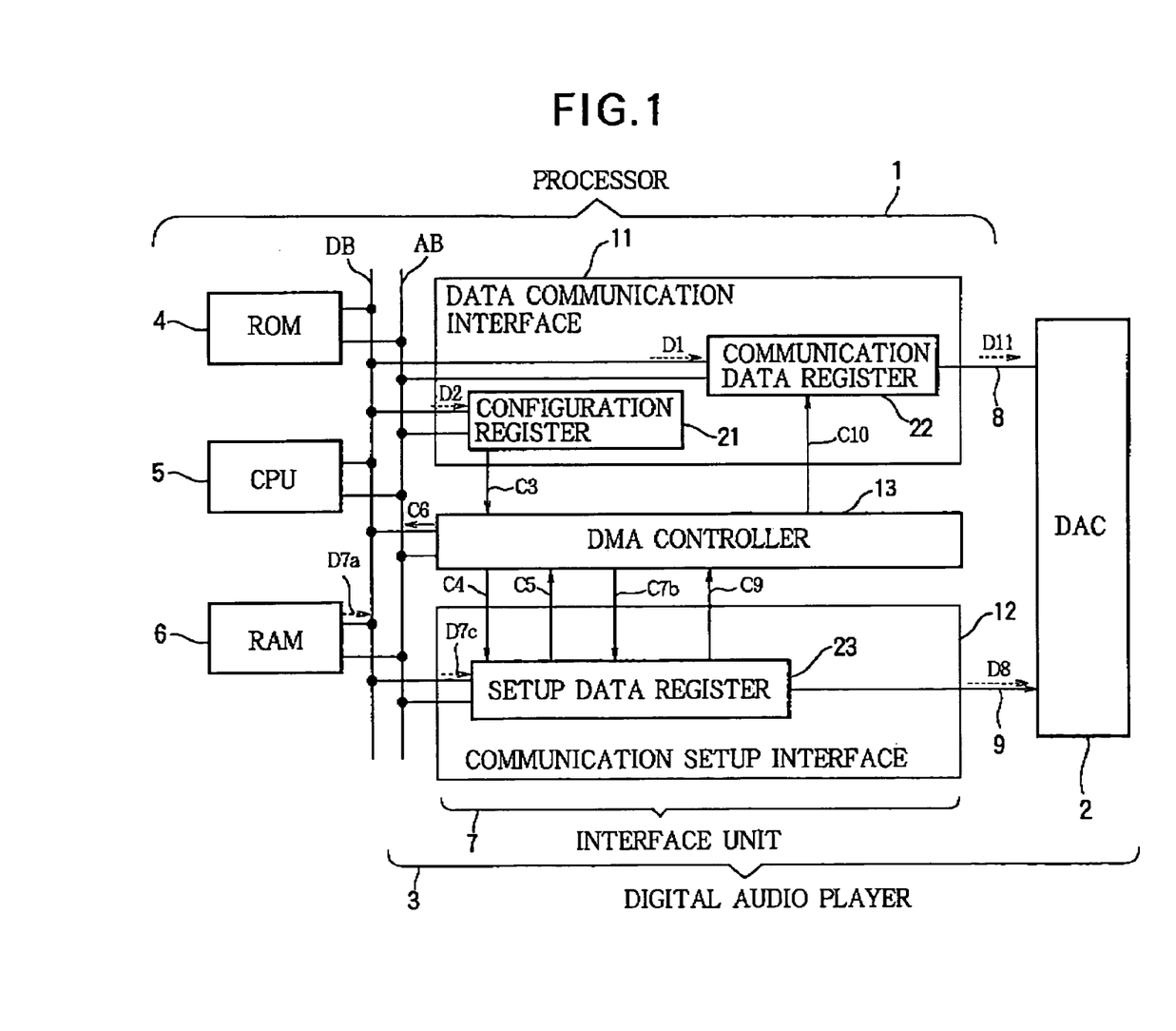
FIG. 1 is a block diagram of a processor connected to an external device according to a first embodiment of the invention.

A first embodiment of the invention will be described with reference to FIG. 1, which shows a processor 1 connected to a digital-to-analog converter (DAC) 2 as part of a digital audio player 3.

The processor 1 includes a read-only memory (ROM) 4 storing control programs for implementing various functions of the player 3, a CPU 5 that operates according to the control programs stored in the ROM 4 to function as the master controller of the player 3, a random access memory (RAM) 6 for temporary data storage, and an interface unit 7, these components being interconnected by a data bus DB and an address bus AB. The RAM 6 is used for storing audio data such as, for example, data in the well-known MP3 (Music Player 3) format.

The interface unit 7 includes a data communication interface 11 that performs serial data communication with the digital-to-analog converter 2 according to the $I^2S$ protocol through a data interface channel 8, and a communication setup interface 12 that performs serial data communication according to the $I^2C$ protocol through a control interface channel 9 to set configuration data in a configuration register in the digital-to-analog converter 2. The interface unit 7 additionally includes a DMA (Direct Memory Access) controller 13. Incidentally, $I^2S$ and $I^2C$ are registered trademarks, $I^2S$ denoting Inter-IC Sound and $I^2C$ denoting Inter-IC Control.

The data communication interface 11 includes a configuration register 21 for configuration data storage and a communication data register 22 for storing data to be transmitted. The communication setup interface 12 includes a setup data register 23 for storing configuration data to be set in an external device.

Audio data read from a medium (not shown) such as a CD (compact disc) or a DVD (digital versatile disc) are temporarily stored in the RAM 6; the stored audio data are transmitted to the digital-to-analog converter 2 through the data communication interface 11, converted to an analog sound signal, and output through headphones (not shown) or another device, thereby reproducing music or other audible matter that has been recorded as the audio data.

When audio data are transmitted from the processor 1 to the digital-to-analog converter 2 as described above, it is necessary to set configuration data, such as data specifying the data communication speed or bit rate, in both the data communication interface 11 and the digital-to-analog converter 2. To set the configuration data in the digital-to-analog converter 2, the configuration data are written in the setup data register 23 in the communication setup interface 12, then transmitted to the digital-to-analog converter 2 through the control interface channel 9.

The first embodiment uses the following novel method of setting configuration data: the CPU 5 sets the configuration data in the data communication interface 11; then the DMA controller 13 sets the configuration data in the setup data register in the communication setup interface 12.

A description of the operation of the player will be given below, focusing on the procedure for setting the configuration data described above. This procedure can be divided into eleven steps, numbered S1 to S11 below. The configuration data are denoted D2, D7a, D7c, and D8 in FIG. 1, different reference characters being used in different steps in the procedure.

First, in step S1, the CPU 5 reads data to be transmitted from the RAM 6, and writes the data (D1) in the communication data register 22 in the data communication interface 11. In the following description it will be assumed that the data D1 are digital audio data.

Next, in step S2, the CPU 5 reads configuration data from the RAM 6, and writes the data (D2) in the configuration register 21 in the data communication interface 11. In the following description it will be assumed that the configuration data D2 specify a serial communication speed. Needless to say, the configuration data D2 may specify other communication parameters as well.

In step S3, when the data have been written in the configuration register 21 in the data communication interface 11, the data communication interface 11 outputs a configuration setting signal (C3) to the DMA controller 13.

In step S4, the DMA controller 13 responds to this configuration setting signal C3 by sending the communication setup interface 12 a configuration setting notification signal (C4). This signal notifies the communication setup interface 12 that the configuration data have been set in the configuration register 21 in the data communication interface 11.

In step S5, the communication setup interface 12 responds to this signal C4 by sending a configuration request signal (C5) to the DMA controller 13.

In step S6, upon receiving the configuration request signal C5 from the communication setup interface 12, the DMA controller 13 asserts a bus request signal (C6). The CPU 5 then relinquishes the right to use the data bus DB and address bus AB, and the DMA controller 13 obtains this right.

In step S7, the DMA controller 13 reads the configuration data (D7a) from a prescribed address in the RAM 6 onto the data bus DB, outputs a write signal (C7b) to the communication setup interface 12, and thereby writes the configuration data (D7c) from the data bus DB into the setup data register 23 in the communication setup interface 12. The prescribed address in the RAM 6 may be given as a fixed value in the DMA controller 13 in advance, or the CPU 5 may inform the DMA controller 13 of the prescribed address prior to step S1.

In step S8, when the configuration data have been written in the setup data register 23, the communication setup interface 12 sends the configuration data (D8) in the setup data register 23 to the digital-to-analog converter 2 by serial transmission.

In step S9, when the serial transmission has been completed, the communication setup interface 12 outputs a configuration setting completion signal (C9) to the DMA controller 13.

In step S10, upon receiving this completion signal C9, the DMA controller 13 outputs a configuration setting completion signal (C10) to the data communication interface 11.

In step S11, upon receiving this configuration setting completion signal C10, the data communication interface 11 sends the audio (or other) data (D11) stored in the communication data register 22 to the digital-to-analog converter 2 by serial transmission at the communication speed set in the configuration register 21.

The digital-to-analog converter 2 converts the received audio data to an analog signal, which is reproduced as music or the like. The data communication speed specified by the configuration data may be a comparatively low speed, corresponding to an audio sampling rate on the order of 50 KHz, for example.

As described above, in the first embodiment, the CPU 5 only has to write transmit data in the communication data register 22 in the data communication interface 11 in step S1 and configuration data in the configuration register 21 in the data communication interface 11 in step S2. The rest of the procedure, up to the start of serial transmission by the data communication interface 11 in step S11, is performed under control of the DMA controller 13. The processing load on the CPU 5 is thereby reduced.

It is particularly necessary to set the data communication speed in both the data communication interface 11 and the digital-to-analog converter 2, but in the first embodiment, the CPU 5 has to set the data communication speed only in the data communication interface 11; the DMA controller 13 sets the data communication speed in the digital-to-analog converter 2.

Although only the data communication speed was mentioned as configuration data in the description above, if it is necessary to set other configuration information as well, such as information specifying the serial data format, and if the amount of configuration data is greater than the capacity of the setup data register 23, steps S7 and S8 may be carried out repeatedly. For example, a plurality of items of configuration data may be stored in consecutive addresses in the RAM 6. The DMA controller 13 transfers one item of configuration data from the RAM 6 to the setup data register 23, increments the memory address value by one while the communication setup interface 12 is transmitting the item to the digital-to-analog converter 2, and then transfers the next item of configuration data to the setup data register 23.

In a variation of the first embodiment, the CPU 5 relinquishes the right to use the data and address buses immediately after setting the configuration data (D2) in the configuration register 21 in the data communication interface 11 in step S2. The DMA controller 13 can then obtain the right to use the buses immediately after asserting the bus request signal C6 in step S6, without having to wait for the CPU 5 to relinquish the bus right.

Second Embodiment

A second embodiment of the invention will be described with reference to FIG. 2.

The processor 31 in the second embodiment differs from the processor in the first embodiment by replacing the DMA controller with a data transfer controller 32, and including a dedicated data bus 33. Whereas the DMA controller in the first embodiment transferred configuration data from the RAM 6 into the setup data register 23 in the communication setup interface 12, the data transfer controller 32 in the second embodiment transfers configuration data from the configuration register 21 in the data communication interface 11 to the setup data register 23 in the communication setup interface 12, using the dedicated data bus 33.

A description of the operation of a digital audio player will be given below, focusing on the procedure for setting configuration data. This procedure can be divided into ten steps, numbered S21 to S30 below. The configuration data are denoted D2, D26c, and D8 in FIG. 2, different reference characters being used in different steps in the procedure.

First, in step S21, the CPU 5 reads data to be transmitted from the RAM 6, and writes the data (D1, digital audio data, for example) in the communication data register 22 in the data communication interface 11.

Next, in step S22, the CPU 5 reads configuration data from the RAM 6, and writes the data (D2) in the configuration register 21 in the data communication interface 11. As in the first embodiment, it will be assumed that the configuration data D1 specify a serial communication speed.

In step S23, when the data have been written in the configuration register 21 in the data communication interface 11, the data communication interface 11 outputs a configuration setting signal (C3) to the data transfer controller 32.

In step S24, the data transfer controller 32 responds to this configuration setting signal C3 by sending the communication setup interface 12 a configuration setting notification signal (C24), notifying the communication setup interface 12 that the configuration data have been set in the configuration register 21 in the data communication interface 11.

In step S25, the communication setup interface 12 responds to this signal C24 by sending a configuration request signal (C25) to the data transfer controller 32.

In step S26, upon receiving the configuration request signal C25 from the communication setup interface 12, the data transfer controller 32 outputs a read signal (C26a) to the configuration register 21 in the data communication interface 11 and a write signal (C26b) to the setup data register 23 in the communication setup interface 12. As a result, the data transfer controller 32 reads the configuration data stored in the configuration register 21, transfers the data (D26c) to the setup data register 23 through the dedicated data bus 33, and writes the data (D26c) in the setup data register 23.

In step S27, when the configuration data have been written in the setup data register 23, the communication setup interface 12 sends the configuration data (D8) in the setup data register 23 to the digital-to-analog converter 2 by serial transmission.

In step S28, when the serial transmission has been completed, the communication setup interface 12 outputs a configuration setting completion signal (C9) to the data transfer controller 32.

In step S29, upon receiving this completion signal C9, the data transfer controller 32 outputs a configuration setting completion signal (C10) to the data communication interface 11.

In step S30, upon receiving the configuration setting completion signal C10, the data communication interface 11 sends the data (D11) stored in the communication data register 22 to the digital-to-analog converter 2 by serial transmission at the communication speed set in the configuration register 21.

If other configuration information, such as information specifying the serial data format, must be set in the digital-to-analog converter 2, the CPU 5 transmits these configuration data to the digital-to-analog converter 2 through the communication setup interface 12. The serial data format has to be set in the digital-to-analog converter 2 only, for example, when the device is turned on; the data communication speed must be set more frequently. Accordingly, even if the CPU 5 has to set the serial data format and other infrequently changed configuration information in the digital-to-analog converter 2, the processing load on the CPU 5 is still significantly reduced.

As described above, in the second embodiment, as in the first embodiment, the CPU 5 only has to write transmit data in the communication data register 22 in the data communication interface 11 in step S21 and configuration data in the configuration register 21 in the data communication interface 11 in step S22. The rest of the procedure, up to the start of serial transmission by the data communication interface 11 in step S30, is performed without intervention by the CPU 5, the processing load on which is reduced accordingly. Since the dedicated data bus 33 is used to transfer the configuration data, the CPU 5 does not have to relinquish the right to use the data bus DB and address bus AB; it can use these buses to perform other processing while the data transfer controller 32 is setting the communication speed in the setup data register 23 in the communication setup interface 12.

Third Embodiment

Figure 3:
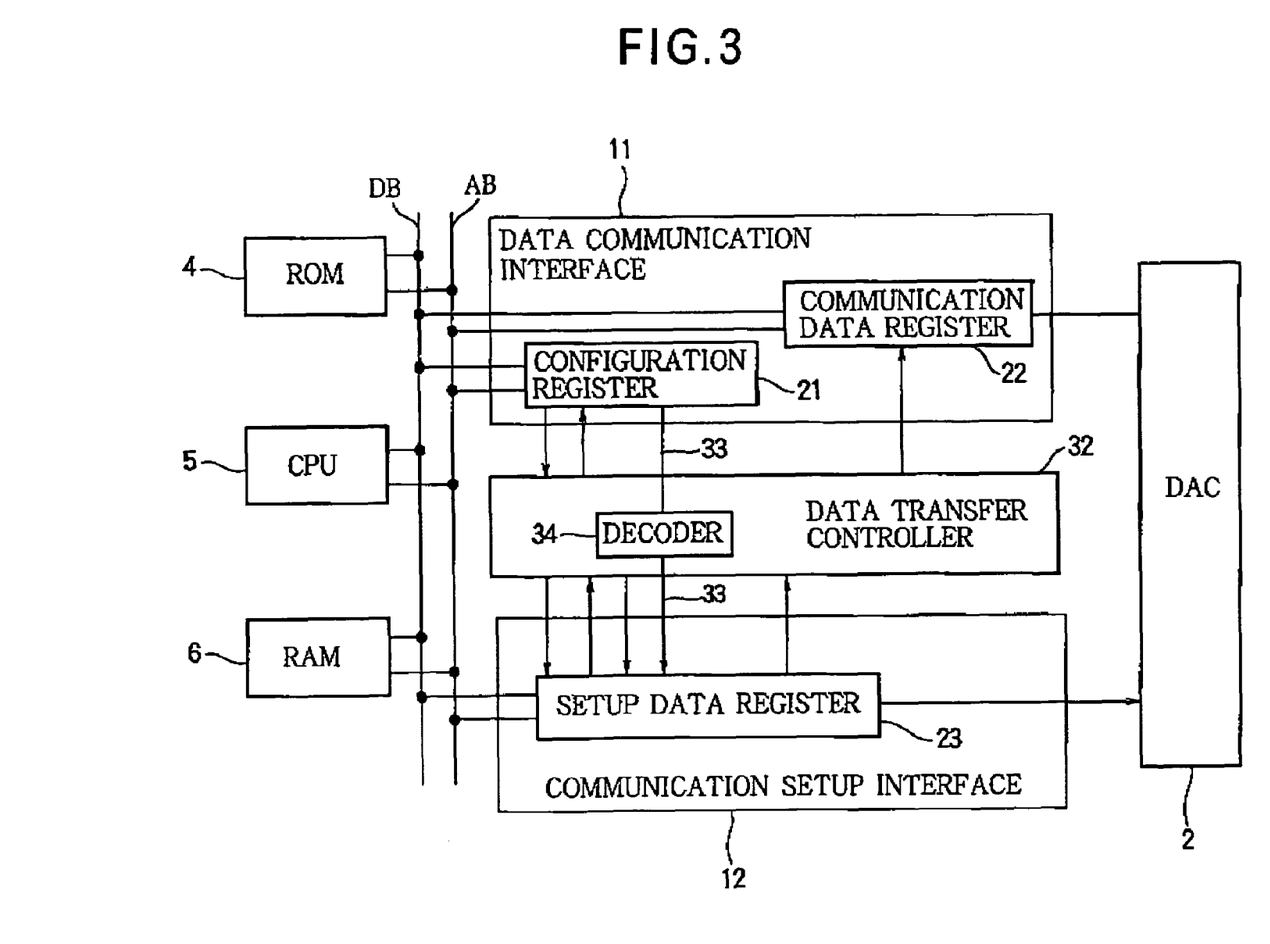
FIG. 3 is a block diagram of a processor connected to an external device according to a third embodiment.

A third embodiment of the invention will be described with reference to FIG. 3.

Figure 2:
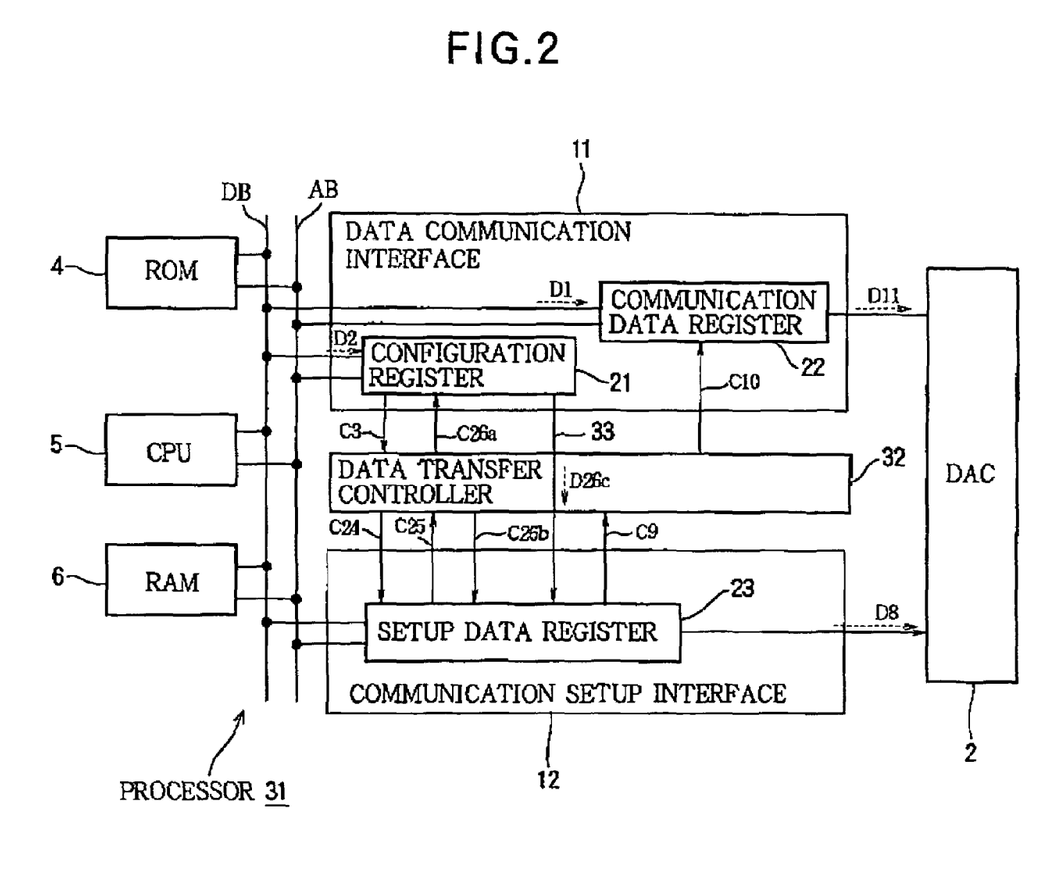
FIG. 2 is a block diagram of a processor connected to an external device according to a second embodiment.

The processor 41 in the third embodiment differs from the processor 31 in the second embodiment in FIG. 2 by inserting a decoder 34 on the dedicated data bus 33 between the configuration register 21 and the setup data register 23. In the third embodiment, when configuration data are transferred from the configuration register 21 to the setup data register 23, the decoder 34 reformats the transferred configuration data.

When the configuration data format used in the data communication interface 11 differs from the format used in the digital-to-analog converter 2, the decoder 34 receives the configuration data, converts the format of the received configuration data from the format suitable for the configuration register 21 in the data communication interface 11 to the format suitable for being set in the digital-to-analog converter 2, and transfers the reformatted configuration data.

Aside from this reformatting, the third embodiment operates in the same way as the second embodiment and provides the same effects.

Fourth Embodiment

A fourth embodiment of the invention will be described with reference to FIG. 4.

The processor 41 in the fourth embodiment differs from the processor 41 in the third embodiment by replacing the communication setup interface 12 and the digital-to-analog converter 2 with an output port controller 42 and a digital-to-analog converter 43 that does not include a register for storing configuration data. The digital-to-analog converter 43 operates according to control signals applied to a control input terminal 43c.

Whereas, in the third embodiment, configuration data to be set in the digital-to-analog converter 2 are written in the setup data register 23 in the communication setup interface 12, and the setup data register 23 transmits the configuration data to the digital-to-analog converter 2, in the fourth embodiment, configuration data, such as data specifying the data communication speed, are written in a control data register 44 in the output port controller 42, the output port controller 42 outputs the configuration data from an output port 42p continuously to the control input terminal 43c in the digital-to-analog converter 43 as control signals, and the digital-to-analog converter 43 operates according to the control signals applied to the control input terminal 43c. For example, the digital-to-analog converter 43 operates at the communication speed specified by the control signals applied to the control input terminal 43c.

A detailed description of the operation at the start of data communication will be given below, focusing on the procedure for setting configuration data in the configuration register 21 in the data communication interface 11 and in control data register 44 in the output port controller 42. This procedure can be divided into six steps, numbered S41 to S46 below. The configuration data are denoted D2, D43b, D43c and D44 in FIG. 4, different reference characters being used in different steps in the procedure.

First, in step S41, the CPU 5 reads data to be transmitted from the RAM 6, and writes the data (D1, digital audio data, for example) in the communication data register 22 in the data communication interface 11.

Next, in step S42, the CPU 5 reads configuration data from the RAM 6, and writes the data (D2) in the configuration register 21 in the data communication interface 11. As in the preceding embodiments, it will be assumed that the configuration data D1 specify a serial communication speed.

In step S43, when the data have been written in the configuration register 21 in the data communication interface 11, the data communication interface 11 outputs a write signal (C43a) to control data register 44 in the output port controller 42, and outputs the configuration data (D43b) stored in the configuration register 21 onto the dedicated data bus 33. The decoder 34 decodes (reformats) the configuration data on the dedicated data bus 33, and outputs the reformatted data (D43c) to the output port controller 42. As a result, the configuration data that the decoder 34 has reformatted are written in control data register 44 in the output port controller 42 as control data.

In step S44, when the configuration data have been written in control data register 44, the output port controller 42 begins the output of the data (D44) from the output port 42p. As a result, the digital-to-analog converter 43 operates at the communication speed set according to the control signals applied to the control input terminal 43c.

In step S45, the output port controller 42 outputs an output port setting completion signal (C45) to the data communication interface 11 immediately after beginning the output of the control signals.

In step S46, upon receiving the output port setting completion signal C45, the data communication interface 11 sends the data (D11) stored in the communication data register 22 to the digital-to-analog converter 43 by serial transmission at the communication speed specified by the configuration data set in the configuration register 21.

Although the data communication speed was mentioned as configuration data in the description above, if it is necessary to apply other configuration information as well, such as information specifying the serial data format, to a control input terminal 43d in the digital-to-analog converter 43, the output port controller 42 may include another data register (control data register 46 in FIG. 4, for example); the CPU 5 sets the other configuration data in control data register 46, and the output port controller 42 outputs these configuration data from an additional output port 42q to control input terminal 43d.

The serial data format has to be written in control data register 46 only, for example, when the device is turned on; the data communication speed must be set in control data register 44 more frequently. Accordingly, even if the CPU 5 has to write the serial data format and other infrequently changed configuration information in control data register 46, the processing load on the CPU 5 is still significantly reduced.

As described above, in the fourth embodiment, as in the first, second, and third embodiments, the CPU 5 only has to write transmit data in the communication data register 22 in the data communication interface 11 in step S41 and configuration data in the configuration register 21 in the data communication interface 11 in step S42. The rest of the procedure, up to the start of serial transmission by the data communication interface 11 in step S46, is performed without intervention by the CPU 5, the processing load on which is reduced accordingly.

Figure 4:
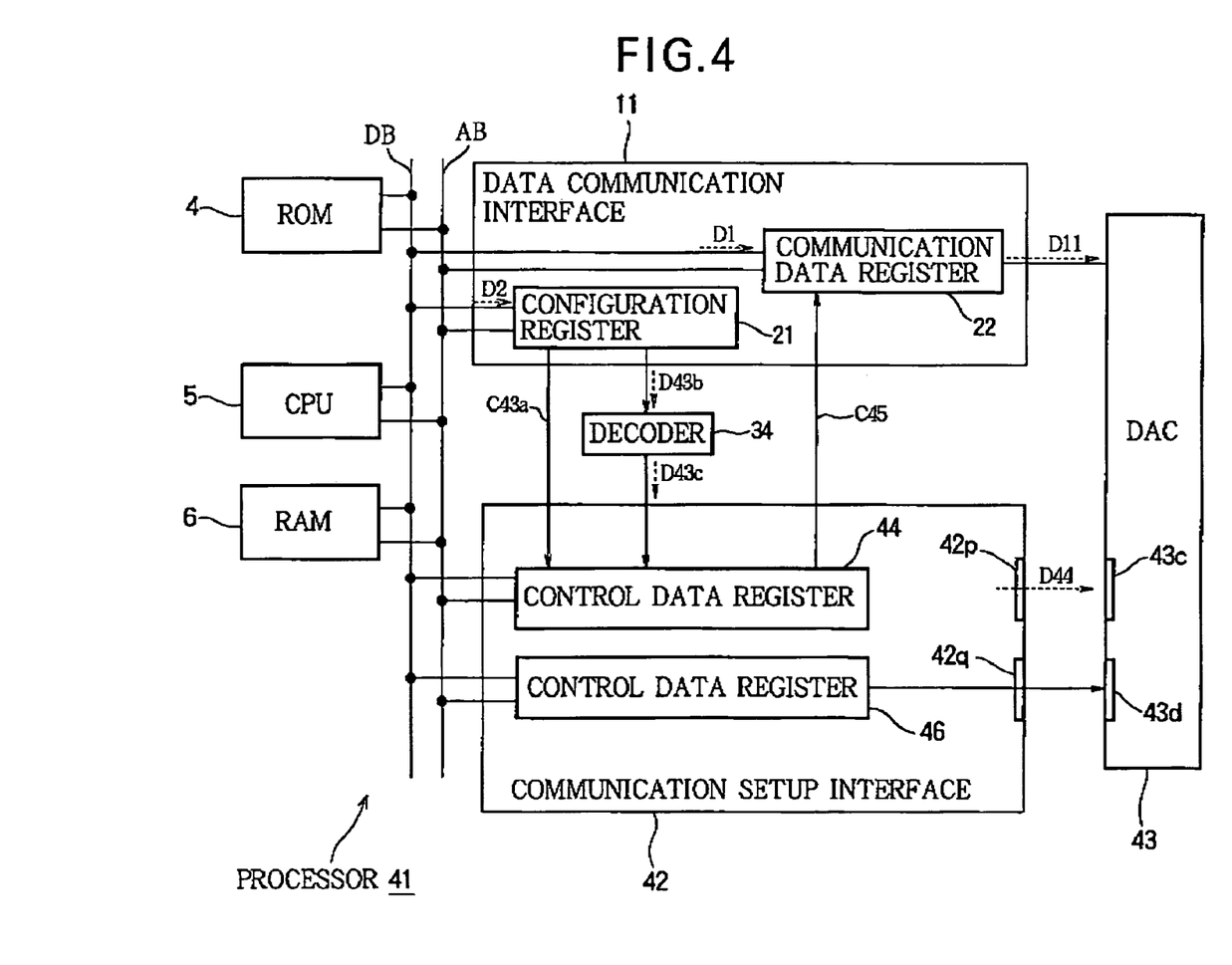
FIG. 4 is a block diagram of a processor connected to an external device according to a fourth embodiment.

Although the fourth embodiment shown in FIG. 4 includes the decoder 34, if the configuration data format suitable for use in the data communication interface 11 and the format suitable to be applied to the control input terminal in the digital-to-analog converter 43 are the same, the decoder 34 may be omitted, and the data stored in the configuration register 21 in the data communication interface 11 may be written in the control data register 44 in the output port controller 42 without being reformatted.

Fifth Embodiment

Although the CPU 5 sets configuration data in the configuration register in the data communication interface 11 in the embodiments described above, the invention also provides processors in which the CPU 5 writes configuration data in the setup data register in the communication setup interface 12 or in the control data register in the output port controller 42, and the configuration data are written in the configuration register in the data communication interface by the DMA controller, the data transfer controller, or the decoder. The fifth, sixth, and seventh embodiments described below are examples of such processors. These embodiments also reduce the CPU processing load.

Figure 5:
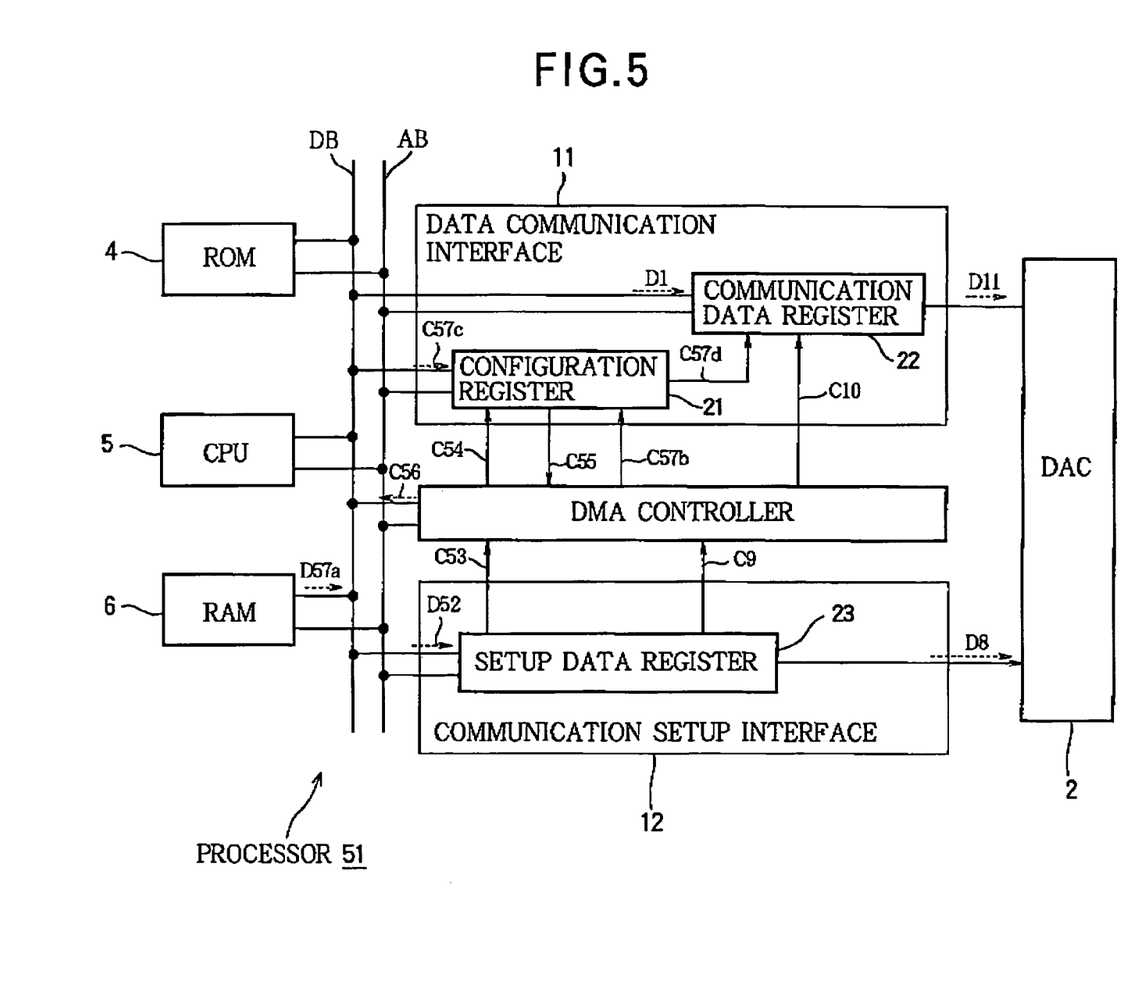
FIG. 5 is a block diagram of a processor connected to an external device according to a fifth embodiment.

The fifth embodiment, which is generally similar to the first embodiment, will be described with reference to FIG. 5.

Whereas, in the first embodiment, a configuration setting signal (C3) is output from the configuration register 21 in the data communication interface 11 to the DMA controller 13, a configuration setting notification signal (C4) and a write signal (C7b) are output from the DMA controller 13 to the setup data register 23 in the communication setup interface 12, and a configuration request signal (C5) is output from the setup data register 23 to the DMA controller 13, in the fifth embodiment, a configuration setting signal (C53) is output from the setup data register 23 to the DMA controller 13, a configuration setting notification signal (C54) and a write signal (C57b) are output from the DMA controller 13 to the configuration register 21, and a configuration request signal (C55) is output from the configuration register 21 to the DMA controller 13.

The communication data register 22 begins communication with the digital-to-analog converter when it receives a signal C10 from the DMA controller 13 and a signal C57d from the configuration register 21.

A description of the operation of the digital audio player will be given below, focusing on the procedure for setting the configuration data. This procedure can be divided into eleven steps, numbered S51 to S61 below. The configuration data are denoted D52, D57a, D57c, and D8 in FIG. 5, different reference characters being used in different steps in the procedure.

First, in step S51, the CPU 5 reads data to be transmitted from the RAM 6, and writes the data (D1, digital audio data, for example) in the communication data register 22 in the data communication interface 11.

Next, in step S52, the CPU 5 reads configuration data from the RAM 6, and writes the data (D52) in the setup data register 23 in the communication setup interface 12. As in the preceding embodiments, it will be assumed that the configuration data D1 specify a serial communication speed.

In step S53, when the data have been written in the setup data register 23 in the communication setup interface 12, the communication setup interface 12 outputs a configuration setting signal (C53) to the DMA controller 13.

In step S54, the DMA controller 13 responds to the configuration setting signal C53 by sending the data communication interface 11 a configuration setting notification signal (C54). This signal notifies the data communication interface 11 that the configuration data have been set in the setup data register 23 in the communication setup interface 12.

In step S55, the data communication interface 11 responds to this signal C54 by sending a configuration request signal (C55) to the DMA controller 13.

In step S56, upon receiving the configuration request signal C55 from the data communication interface 11, the DMA controller 13 asserts a bus request signal (C56). The CPU 5 then relinquishes the right to use the data bus DB and address bus AB, and the DMA controller 13 obtains this right.

In step S57, the DMA controller 13 reads the configuration data (D57a) from a prescribed address in the RAM 6 onto the data bus DB, outputs a write signal (C57b) to the data communication interface 11, and thereby writes the configuration data (D57c) from the data bus DB into the configuration register 21 in the data communication interface 11.

When the configuration data have been written in the configuration register 21, a configuration setting completion signal (C57d) is output to the communication data register 22.

In step S58, when the configuration data (D52) have been written in the setup data register 23 in step S52, the communication setup interface 12 sends the configuration data (D8) in the setup data register 23 to the digital-to-analog converter 2 by serial transmission, concurrent with the operations in steps S53 to S57.

In step S59, when the serial transmission has been completed, the communication setup interface 12 outputs a configuration setting completion signal (C9) to the DMA controller 13.

In step S60, upon receiving this configuration setting completion signal C9, the DMA controller 13 outputs a configuration setting completion signal (C10) to the data communication interface 11.

In step S61, when the communication data register 22 has received both configuration setting completion signals C10 and C57d from the DMA controller 13 and from the configuration register 21, the data communication interface 11 sends the audio (or other) data (D11) stored in the communication data register 22 to the digital-to-analog converter 2 by serial transmission at the communication speed set in the configuration register 21.

As described above, in the fifth embodiment, when the CPU 5 reads configuration data from the RAM 6, and writes the data (D52) in the setup data register 23 in the communication setup interface 12, the DMA controller 13 reads the same configuration data from the RAM 6 and writes the data (D57c) in the configuration register 21 in the data communication interface 11. When the DMA controller 13 has written the data (D57c) in the configuration register 21, and the setup data register 23 in the communication setup interface 12 has sent the configuration data to the digital-to-analog converter 2 by serial transmission, the communication data register 22 begins the transmission of other data to the digital-to-analog converter 2.

Sixth Embodiment

Figure 6:
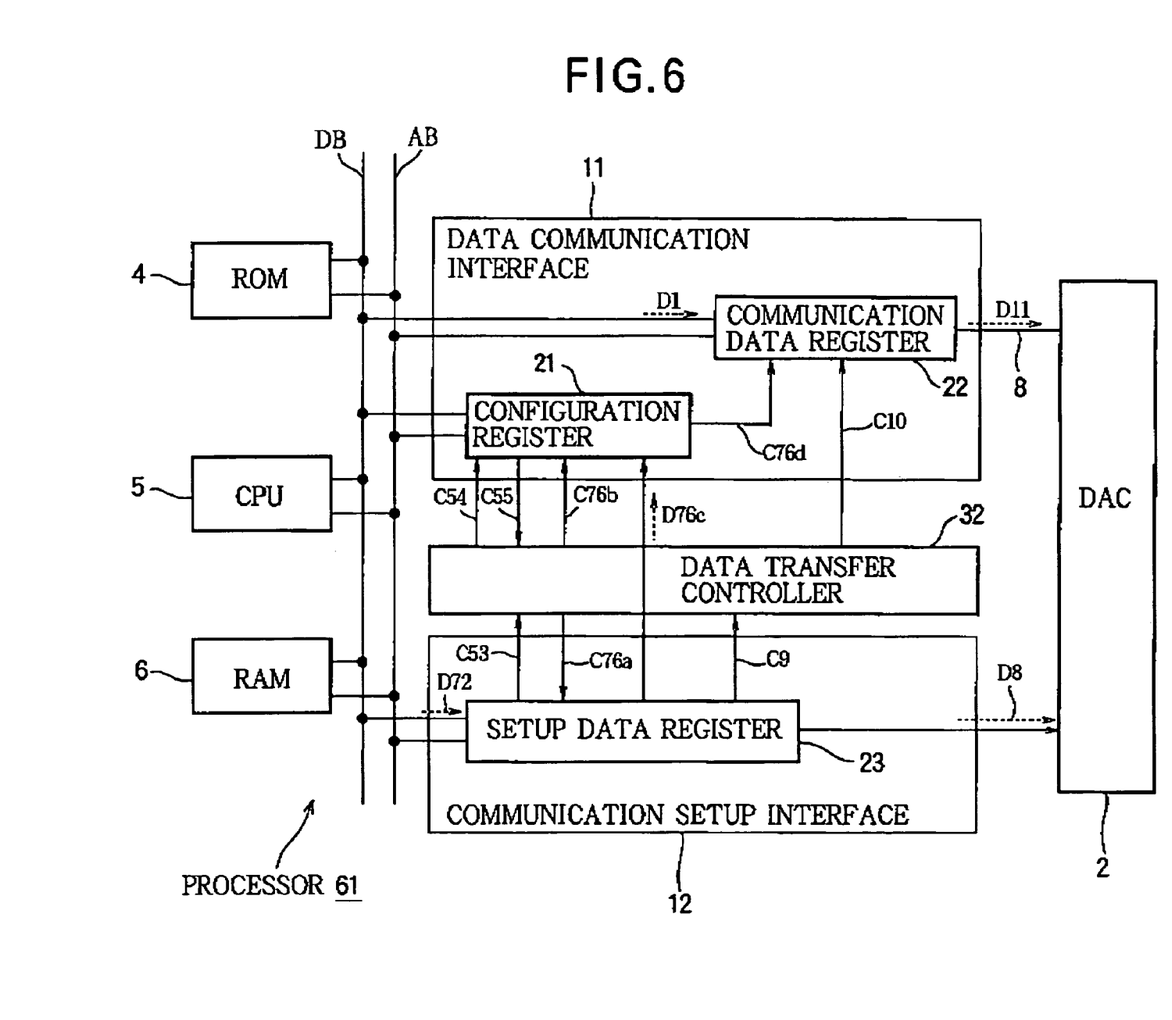
FIG. 6 is a block diagram of a processor connected to an external device according to a sixth embodiment.

The sixth embodiment, which is generally similar to the second embodiment, will be described with reference to FIG. 6.

Whereas, in the second embodiment, a configuration setting signal (C3) is output from the configuration register 21 in the data communication interface 11 to the data transfer controller 32, a configuration setting notification signal (C24) and a write signal (C26b) are output from the data transfer controller 32 to the setup data register 23 in the communication setup interface 12, a configuration request signal (C25) is output from the setup data register 23 to the data transfer controller 32, and a read signal (C26a) is output from the data transfer controller 32 to the configuration register 21, in the sixth embodiment, a configuration setting signal (C53) is output from the setup data register 23 to the data transfer controller 32, a configuration setting notification signal (C54) and a write signal (C76b) are output from the data transfer controller 32 to the configuration register 21, a configuration request signal (C55) is output from the configuration register 21 to the data transfer controller 32, and a read signal (C76a) is output from the data transfer controller 32 to the setup data register 23.

The communication data register 22 begins communication with the digital-to-analog converter when it receives a signal C10 from the data transfer controller 32 and a signal C76d from the configuration register 21.

A description of the operation of the digital audio player will be given below, focusing on the procedure for setting the configuration data. This procedure can be divided into ten steps, numbered S71 to S80 below. The configuration data are denoted D72, D76c, and D8 in FIG. 6, different reference characters being used in different steps in the procedure.

First, in step S71, the CPU 5 reads data to be transmitted from the RAM 6, and writes the data (D1, digital audio data, for example) in the communication data register 22 in the data communication interface 11.

Next, in step S72, the CPU 5 reads configuration data from the RAM 6, and writes the data (D72) in the setup data register 23 in the communication setup interface 12. As in the preceding embodiments, it will be assumed that the configuration data D1 specify a serial communication speed.

In step S73, when the data have been written in the setup data register 23 in the communication setup interface 12, the communication setup interface 12 outputs a configuration setting signal (C53) to the data transfer controller 32.

In step S74, the data transfer controller 32 responds to the configuration setting signal C53 by sending the data communication interface 11 a configuration setting notification signal (C54). This signal notifies the data communication interface 11 that the configuration data have been set in the setup data register 23 in the communication setup interface 12.

In step S75, the data communication interface 11 responds to this signal C54 by sending a configuration request signal (C55) to the data transfer controller 32.

In step S76, upon receiving the configuration request signal C55 from the data communication interface 11, the data transfer controller 32 outputs a read signal (C76a) to the setup data register 23 in the communication setup interface 12 and a write signal (C76b) to the configuration register 21 in the data communication interface 11. As a result, the data transfer controller 32 reads the configuration data stored in the setup data register 23, transfers the data (D76c) to the configuration register 21 through the dedicated data bus 33, and writes the data (D76c) in the configuration register 21.

When the configuration data have been written in the configuration register 21, a configuration setting completion signal (C76d) is output to the communication data register 22.

In step S77, when the configuration data (D72) have been written in the setup data register 23 in step S72, the communication setup interface 12 sends the configuration data (D8) in the setup data register 23 to the digital-to-analog converter 2 by serial transmission, concurrent with the operations in steps S73 to S76.

In step S78, when the serial transmission has been completed, the communication setup interface 12 outputs a configuration setting completion signal (C9) to the data transfer controller 32.

In step S79, upon receiving this completion signal C9, the data transfer controller 32 outputs a configuration setting completion signal (C10) to the data communication interface 11.

In step S80, when the communication data register 22 has received both configuration setting completion signals C10 and C76d from the data transfer controller 32 and from the configuration register 21, the data communication interface 11 sends the audio (or other) data (D11) stored in the communication data register 22 to the digital-to-analog converter 2 by serial transmission at the communication speed set in the configuration register 21.

As described above, in the sixth embodiment, when the CPU 5 reads configuration data from the RAM 6, and writes the data (D72) in the setup data register 23 in the communication setup interface 12, the configuration data stored in the setup data register 23 are transferred to the configuration register 21. When the configuration data stored in the setup data register 23 have been transferred to the configuration register 21, and the setup data register 23 has sent the configuration data to the digital-to-analog converter 2 by serial transmission, the communication data register 22 begins the transmission of other data to the digital-to-analog converter 2.

Seventh Embodiment

Figure 7:
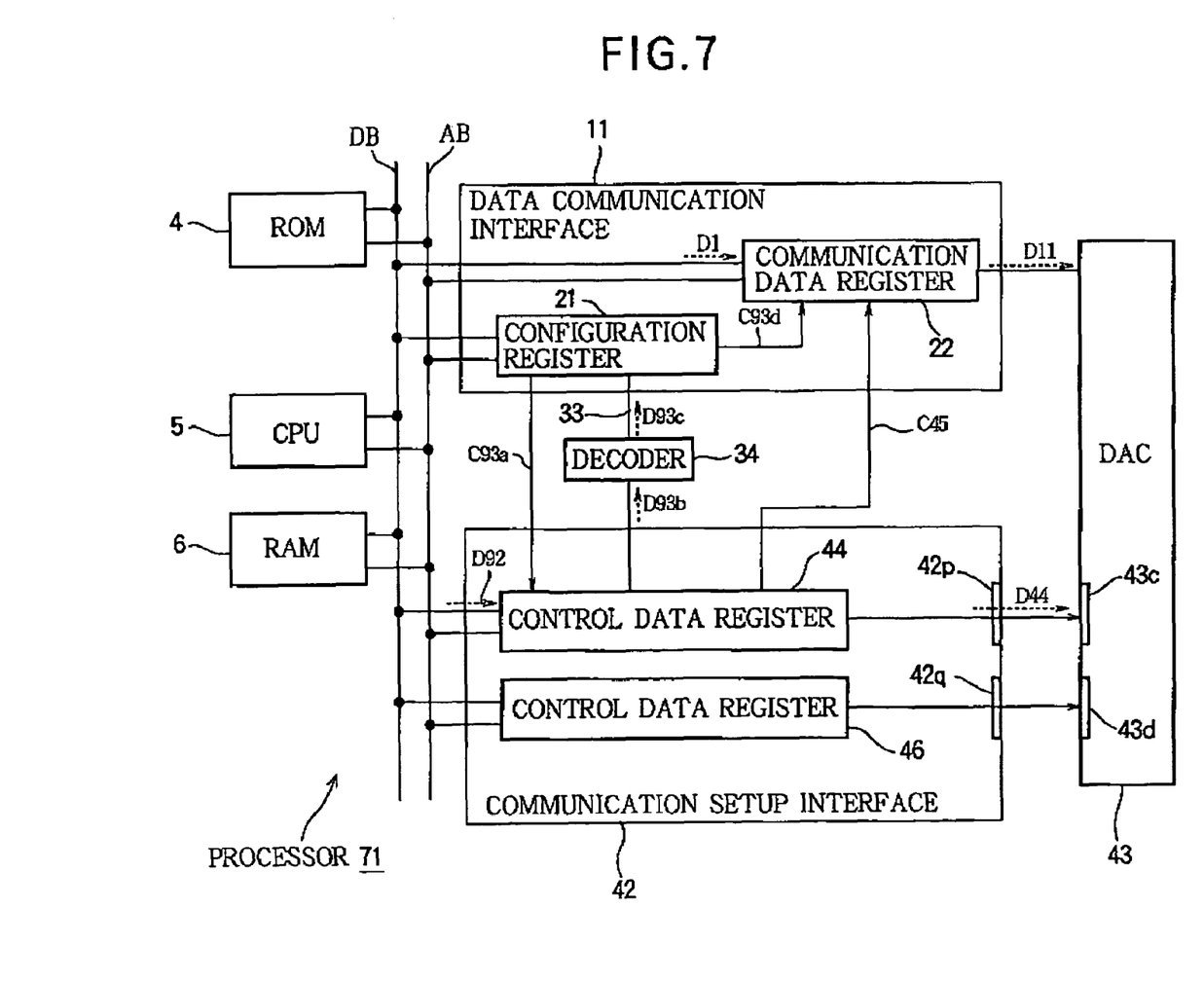
FIG. 7 is a block diagram of a processor connected to an external device according to a seventh embodiment.

The seventh embodiment, which is generally similar to the fourth embodiment, will be described with reference to FIG. 7.

Whereas, in the fourth embodiment, a write signal (C43a) is output from the configuration register 21 in the data communication interface 11 to control data register 44 in the output port controller 42, in the seventh embodiment, a write signal (C93a) is output from control data register 44 to the configuration register 21.

The communication data register 22 begins communication with the digital-to-analog converter when it receives a signal C45 from the output port controller 42 and a signal C93d from the configuration register 21.

A detailed description of the operation at the start of data communication will be given below, focusing on the procedure for setting configuration data in the configuration register 21 in the data communication interface 11 and in control data register 44 in the output port controller 42. This procedure can be divided into six steps, numbered S91 to S96 below. The configuration data are denoted D92, D93b, D93c and D44 in FIG. 7, different reference characters being used in different steps in the procedure.

First, in step S91, the CPU 5 reads data to be transmitted from the RAM 6, and writes the data (D1, digital audio data, for example) in the communication data register 22 in the data communication interface 11.

Next, in step S92, the CPU 5 reads configuration data from the RAM 6, and writes the data (D92) in control data register 44 in the output port controller 42. As in the preceding embodiments, it will be assumed that the configuration data D1 specify a serial communication speed.

In step S93, when the data have been written in control data register 44 in the output port controller 42, the output port controller 42 outputs a write signal (C93a) to the configuration register 21 in the data communication interface 11, and outputs the configuration data (D93b) stored in control data register 44 onto the dedicated data bus 33. The decoder 34 decodes (reformats) the configuration data on the dedicated data bus 33, and outputs the reformatted data (D93c) to the data communication interface 11. As a result, the configuration data that the decoder 34 has reformatted are written in the configuration register 21 in the data communication interface 11.

When the configuration data have been written in the configuration register 21, the configuration register 21 outputs a configuration setting completion signal (C93d) to the communication data register 22.

In step S94, when the configuration data have been written in control data register 44, the output port controller 42 begins the output of the data (D44) from the output port 42p. As a result, the digital-to-analog converter 43 operates at the communication speed set according to the control signals applied to the control input terminal 43c.

In step S95, the output port controller 42 outputs an output port setting completion signal (C45) to the data communication interface 11 immediately after beginning the output of the control signals.

In step S96, when the communication data register 22 has received both output port setting completion signal C45 and configuration setting completion signal C93d, the data communication interface 11 sends the data (D11) stored in the communication data register 22 to the digital-to-analog converter 43 by serial transmission at the communication speed specified by the configuration data set in the configuration register 21.

Although the data communication speed was mentioned as configuration data in the description above, if it is necessary to apply other configuration information as well, such as information specifying the serial data format, to a control input terminal 43d in the digital-to-analog converter 43, the output port controller 42 may include another data register (control data register 46 in FIG. 7, for example); the CPU 5 sets the other configuration data in control data register 46, and the output port controller 42 outputs these configuration data from an additional output port 42q to control input terminal 43d.

As described above, in the seventh embodiment, when the CPU 5 reads configuration data from the RAM 6, and writes the data (D92) in control data register 44 in the output port controller 42, the configuration data stored in control data register 44 are transferred to the configuration register 21 in the data communication interface 11. When the configuration data stored in control data register 44 have been transferred to the configuration register 21, and the control data register 44 has begun the output of the data to the output port 42p, the communication data register 22 begins the transmission of audio or other data to the digital-to-analog converter 43.

The digital audio player to which the invention is applied in the embodiments above is only one an example of an apparatus, having a processor and an external device, in the invention can be practiced. Another example is a digital audio recorder. In a digital audio recorder, the external device is an analog-to-digital converter from which the data communication interface 11 receives data by serial transmission. The communication data register 22 temporarily stores the received data. The analog-to-digital converter converts an analog signal received from a microphone or another source to a digital signal, which is input to the processor 1 through the data communication interface 11, undergoes signal processing, and is then stored in the RAM 6.

Those skilled in the art will recognize that further variations are possible within the scope of the invention, which is defined in the appended claims.

What is claimed is:

1. A method of performing data communication between a processor and an external device, the processor having a central processing unit (CPU), a first interface connected to the external device to transfer data between the processor and the external device, and a second interface connected to the external device to control the external device, the method comprising:

using the CPU, communicably connected to the first interface and the second interface, to set a communication parameter in one of the first interface and the second interface, by transferring said communication parameter over a first data bus;

transferring said communication parameter from said one of the first interface and the second interface to the other of the first interface and the second interface over a second data bus without intervention by the CPU;

transferring said communication parameter from the second interface to the external device;

said second data bus being separate from said first data bus and being used only for the transfer of said communication parameter between said first interface and second interface;

and transferring said data between the CPU and the external device over said first data bus, and through the first interface according to said communication parameter.

2. The method of claim 1, wherein transferring said communication parameter to said the other one of the first interface and the second interface includes reformatting the communication parameter.

3. The method of claim 1, wherein the external device is an analog-to-digital converter or a digital-to-analog converter.

4. The method of claim 3, wherein the data transferred between the CPU and the external device through the first interface are audio data.

5. The method of claim 1, wherein the communication parameter specifies a communication speed.

6. A processor comprising:

a first interface connected to an external device to communicate with the external device according to configuration data specifying a communication parameter, the first interface having a first register that stores the configuration data and a second register that stores data transmitted to or received from the external device;

a second interface connected to the external device to send the configuration data to the external device, the second interface having a third register for storing the configuration data;

a central processing unit (CPU) setting the configuration data in one of the first register and the third register;

a first data bus connecting the first interface, the second interface and the CPU;

a second data bus connecting the first interface to the second interface;

said configuration data being transferred from said CPU to said one of the first register and the third register;

and a data transfer controller transferring the configuration data from said one of the first register and the third register to the other of the first register and the third register over the second data bus without intervention by the CPU:

said data being transferred between said CPU and said external device over said first data bus and via the first interface;

and said second data bus being separate from said first data bus, and being used only for the transfer of the configuration data between the first register and the third register.

7. The processor of claim 6, wherein the data transfer controller reformats the configuration data.

8. The processor of claim 6, wherein:

the CPU writes the configuration data in the first register;

the first interface notifies the data transfer controller that the configuration data have been written in the first register;

the data transfer controller reads the configuration data from the first register and writes the configuration data thus read in the third register in the second interface;

the second interface transmits the configuration data written in the third register to the external device, and notifies the first interface when the transmission of the configuration data to the external device has been completed;

upon being notified that the transmission of the configuration data to the external device has been completed, the first interface begins communicating with the external device through the second register.

9. The processor of claim 6, wherein:

the CPU writes the configuration data in the third register;

the second interface notifies the data transfer controller that the configuration data have been written in the third register;

the data transfer controller reads the configuration data from the third register and writes the configuration data thus read in the first register in the first interface;

the second interface transmits the configuration data written in the third register to the external device, and notifies the first interface when the transmission of the configuration data to the external device has been completed;

upon being notified that the transmission of the configuration data to the external device has been completed, the first interface begins communicating with the external device through the second register.

10. The processor of claim 6, wherein the second interface comprises an output port and an output port controller controlling the output port.

11. The processor of claim 10, wherein the data transfer controller further comprises a decoder that reformats the configuration data.

12. The processor of claim 10, wherein:

the CPU writes the configuration data in the first register;

the first interface reads the configuration data from the first register and writes the configuration data in the third register;

the output port controller begins output of the configuration data written in the third register to the external device, and notifies the first interface that the output of the configuration data to the external device has begun;

upon being notified that the output of the configuration data to the external device has begun, the first interface begins communicating with the external device through the second register.

13. The processor of claim 10, wherein:

the CPU writes the configuration data in the third register;

the output port controller notifies the data transfer controller that the configuration data have been written in the first register;

the output port controller reads the configuration data from the third register and writes the configuration data in the first register of the first interface;

the output port controller begins output of the configuration data written in the third register to the external device, and notifies the first interface that the output of the configuration data to the external device has begun;

upon being notified that the output of the configuration data to the external device has begun, the first interface begins communicating with the external device through the second register.

14. The processor of claim 6, wherein the external device is an analog-to-digital converter or a digital-to-analog converter.

15. The processor of claim 14, wherein the data stored in the second register are audio data.

16. The processor of claim 6, wherein the configuration data specify a communication speed.

17. The method of claim 6, wherein the data is transferred between the CPU and the external device without being passed through the second interface; and the communication parameter is transferred from the second interface to the external device without being passed through the first interface.

18. The processor of claim 6, wherein the data is transferred between the CPU and the external device without being passed through the second interface; and the configuration data is sent from the second interface to the external device without being passed through the first interface.

* * * * *